(12) United States Patent
Chen et al.

(10) Patent No.: US 8,111,772 B2
(45) Date of Patent: Feb. 7, 2012

(54) METHOD AND APPARATUS FOR MULTI-ANTENNA TRANSMITTING BASED ON SPATIAL-FREQUENCY ENCODING

(75) Inventors: Lina Chen, Shenzhen (CN); Peigang Jiang, Shenzhen (CN); Jianghua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 752 days.

(21) Appl. No.: 12/206,370

(22) Filed: Sep. 8, 2008

(65) Prior Publication Data

US 2009/0003480 A1    Jan. 1, 2009

Related U.S. Application Data

(63) Continuation of application No. PCT/CN2007/000075, filed on Jan. 9, 2007.

(30) Foreign Application Priority Data

Mar. 15, 2006    (CN) .......................... 2006 1 0070854

(51) Int. Cl.
*H04B 7/02* (2006.01)
*H04L 1/02* (2006.01)

(52) U.S. Cl. ...................................... 375/267

(58) Field of Classification Search .................. 375/219, 375/260, 267, 299, 346, 347, 349, 261, 265, 375/285, 295, 296, 316; 370/203, 208, 210, 370/235, 252, 342, 204, 328, 329, 344
See application file for complete search history.

(56) References Cited

U.S. PATENT DOCUMENTS

| | | | | |
|---|---|---|---|---|
| 6,807,145 | B1* | 10/2004 | Weerackody et al. | 370/203 |
| 2003/0144033 | A1 | 7/2003 | Sumasu et al. | |
| 2003/0147655 | A1* | 8/2003 | Shattil | 398/182 |
| 2005/0032514 | A1 | 2/2005 | Sadri et al. | |
| 2005/0147076 | A1 | 7/2005 | Sadowsky et al. | |
| 2005/0185575 | A1* | 8/2005 | Hansen et al. | 370/208 |
| 2006/0018250 | A1 | 1/2006 | Gu et al. | |
| 2006/0153312 | A1* | 7/2006 | Yun et al. | 375/267 |
| 2007/0104283 | A1* | 5/2007 | Han et al. | 375/260 |
| 2007/0189151 | A1* | 8/2007 | Pan et al. | 370/210 |
| 2007/0211815 | A1* | 9/2007 | Pan et al. | 375/267 |
| 2009/0003466 | A1* | 1/2009 | Taherzadehboroujeni et al. | 375/260 |
| 2009/0147868 | A1* | 6/2009 | Ihm et al. | 375/260 |

(Continued)

FOREIGN PATENT DOCUMENTS

CN    1462519 A    12/2003

(Continued)

OTHER PUBLICATIONS

"Transmit Diversity for Distributed, Common and Broadcast Channels"; R1-051406; TSG-RAN WG1 #43; Seoul, South Korea; Nov. 7-11, 2005; 6 pages.

(Continued)

*Primary Examiner* — David C. Payne
*Assistant Examiner* — Syed Haider (57) ABSTRACT

The present disclosure relates to communication technologies and discloses a method and apparatus for multi-antenna transmitting based on spatial-frequency encoding. The method includes: performing spatial-frequency encoding on input data and outputting encoded data; mapping the encoded data to the same sub-carrier of each antenna in an antenna group; adding a phase shift to the encoded data on different sub-carriers of each antenna; OFDM-modulating the phase-shifted encoded data on each antenna; and transmitting the OFDM-modulated data by transmit antennas.

13 Claims, 9 Drawing Sheets

U.S. PATENT DOCUMENTS

2009/0316807 A1* 12/2009 Kim et al. .................... 375/260

FOREIGN PATENT DOCUMENTS

| CN | 1605172 A | 4/2005 |
|---|---|---|
| WO | 2005/022681 A2 | 3/2005 |

OTHER PUBLICATIONS

"Mulituser Precoding MIMO for E-UTRA Downlink"; R1-050809; 3GPP TSG RAN WG1 Meeting #42; London, UK; Aug. 29-Sep. 2, 2005; 7 pages.

Tan, Jun, et al.; "Multicarrier Delay Diversity Modulcation for MIMO Systems"; IEEE Transactions on Wireless Communications; vol. 3, Nos. 5; Sep. 2004; pp. 1756-1763.

Jafarkhani, Hamid; "A Quasi-Orthogonal Space-Time Block Code"; Transactions Letters; IEEE Transactions on Communications; vol. 49, No. 1; Jan. 2001; pp. 1-4.

Tarokh, Vahid, et al.; "Space-Time Block Codes from Orthogonal Designs"; IEEE Transactions on Information Theory; vol. 45, No. 5; Jul. 1999; pp. 1456-1467.

Alamouti, Siavash M.; "A Simple Transmit Diversity Technique for Wireless Communications"; IEEE Journal on Select Areas in Communications; vol. 16, No. 8; Oct. 1998; pp. 1451-1458.

International Search Report for International Patent Application No. PCT/CN2007/000075, dated Apr. 26, 2007, with English translation thereof.

* cited by examiner

Figure 1

PRIOR ART

METHOD AND APPARATUS FOR MULTI-ANTENNA TRANSMITTING BASED ON SPATIAL-FREQUENCY ENCODING

CROSS-REFERENCE TO RELATED APPLICATIONS

This application is a continuation of International Application No. PCT/CN2007/000075, filed Jan. 9, 2007. This application claims the benefit and priority of Chinese Application No. 200610070854.2, filed Mar. 15, 2006. The entire disclosures of each of the above applications are incorporated herein by reference.

FIELD

The present disclosure relates to communication technologies, and in particular, to a method and apparatus for multi-antenna transmitting based on spatial-frequency encoding.

BACKGROUND

This section provides background information related to the present disclosure which is not necessarily prior art.

In recent years, the multiple input multiple output (MIMO) technology has become a major concern and has been applied in actual communication systems, owing to its ability of improving the transmit spectral efficiency and the reliability of wireless communication systems. In addition, the multi-carrier orthogonal frequency division multiplexing (OFDM) technology has become the focus of study, owing to its ability of overcoming the multipath considerations of wireless channels and achieving a higher spectral efficiency than single-carrier systems. MIMO and OFDM become the key technologies of mobile communication systems and have been widely applied in approaches including long term evolution (LTE) of third generation (3G) mobile communication systems and even fourth generation (4G) mobile communications systems.

Various transmit diversity and spatial multiplexing approaches can be implemented based on MIMO and OFDM technologies. Diversity gain can improve the performance of systems, and spatial multiplexing gain can improve the transmission rate.

Figure 1:
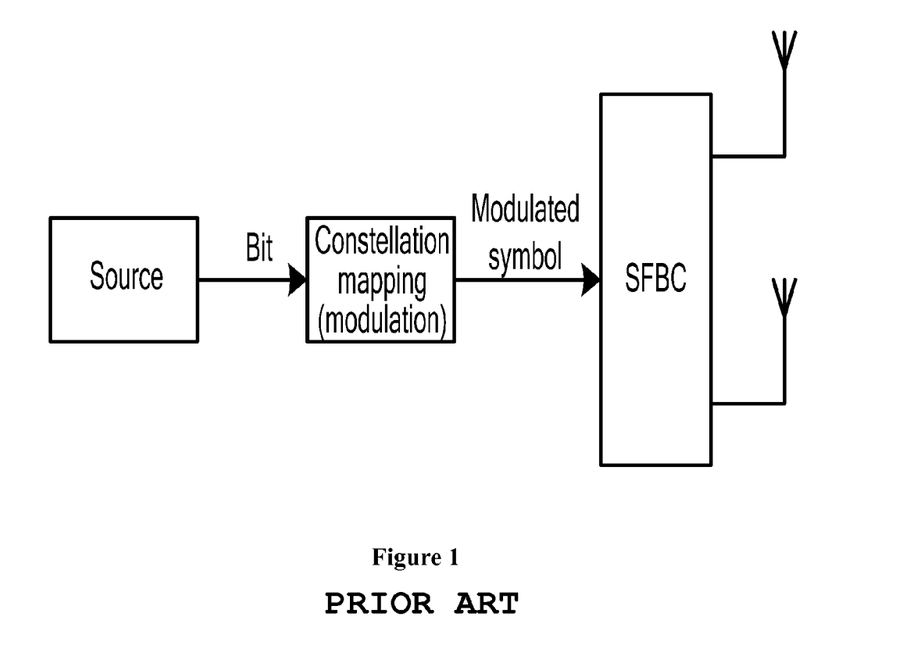
FIG. 1 shows the composition of a transmitter system that uses SFBC to implement transmit diversity in the prior art.

A spatial-frequency encoding approach of the prior art, which is an extension of space-time encoding, replaces the time dimension of space-time encoding with frequency dimension for encoding. This approach is applied mainly in OFDM systems. As shown in FIG. 1, spatial-frequency encoding can obtain diversity gain or spatial multiplexing gain by encoding on multiple sub-carriers and antennas. At present, spatial-frequency encoding is categorized into space frequency block code (SFBC) and spatial multiplexing coding. When the encoding rate of SFBC is equal to or lower than 1, the transmitter performs orthogonal or non-orthogonal encoding on multiple antennas, and the receiver performs maximum likelihood decoding to obtain diversity gain. At present, 2-antenna transmitting based on orthogonal spatial-frequency encoding is applied most widely. Formula (1) shows the encoding matrix.

$$G = \begin{pmatrix} S_1 & -S_2^* \\ S_2 & S_1^* \end{pmatrix} \quad (1)$$

In formula (1), $S_1$ and $S_2$ are the symbols before spatial-frequency encoding. After 2-antenna transmitting based on orthogonal spatial-frequency encoding indicated by formula (1), transmit antenna 1 transmits $S_1$ on the sub-carrier k and $-S_2^*$ on the sub-carrier k+1; transmit antenna 2 transmits $S_2$ on the sub-carrier k and $S_1^*$ on the sub-carrier k+1. It is defined that the encoding rate is n/k, where n indicates the number of data symbols transmitted during one spatial-frequency encoding operation, and k indicates the number of the sub-carriers required for one spatial-frequency encoding operation. As seen from formula 1, the encoding rate for 2-antenna transmitting based on orthogonal spatial-frequency encoding is (1). The multiple sub-carriers occupied for one spatial-frequency encoding operation are hereinafter called a sub-carrier set.

It is supposed that the receiver has only one receive antenna, and that the channel fading factors for the data on two adjacent sub-carriers of the same transmit antenna are the same. The data received by the antenna on two sub-carriers can be expressed by formulas (2) and (3).

$$r_1 = h_1 S_1 + h_2 S_2 + n_1 \quad (2)$$

$$r_2 = h_1(-S_2^*) + h_2 S_1^* + n_2 \quad (3)$$

$h_1$ and $h_2$ indicate the factors for channel fading from the two transmit antennas to the receive antenna. After channel estimation, the receiver can perform the maximum likelihood decoding, as expressed by formulas (4) and (5).

$$\hat{S}_1 = h_1^* r_1 + h_2 r_2^* = (|h_1|^2 + |h_2|^2) S_1 + h_1^* n_1 + h_2 n_2^* \quad (4)$$

$$\hat{S}_2 = h_2^* r_1 - h_1 r_2^* = (|h_1|^2 + |h_2|^2) S_2 - h_1 n_2^* + h_2^* n_1 \quad (5)$$

$\hat{S}_1$ and $\hat{S}_2$ indicate the estimation of the symbols $S_1$ and $S_2$.

As seen from formulas (4) and (5), $S_1$ and $S_2$ each obtain second-order diversity after they are transmitted through the STBC transmit diversity.

When the number of transmit antennas is 3 or 4, only the orthogonal spatial-frequency encoding at rates of ½ and ¾ exists.

Formula (6) shows the matrix of 3-antenna transmitting based on orthogonal spatial-frequency encoding at a rate of ½:

$$G_{3,1} = \begin{pmatrix} S_1 & S_2 & S_3 \\ -S_2 & S_1 & -S_4 \\ -S_3 & S_4 & S_1 \\ -S_4 & -S_3 & S_2 \\ S_1^* & S_2^* & S_3^* \\ -S_2^* & S_1^* & -S_4^* \\ -S_3^* & S_4^* & S_1^* \\ -S_4^* & -S_3^* & S_2^* \end{pmatrix}^T \quad (6)$$

Formula (7) shows the matrix of 4-antenna transmitting based on orthogonal spatial-frequency encoding at a rate of ½:

$$G_{4,1} = \begin{pmatrix} S_1 & S_2 & S_3 & S_4 \\ -S_2 & S_1 & -S_4 & S_3 \\ -S_3 & S_4 & S_1 & -S_2 \\ -S_4 & -S_3 & S_2 & S_1 \\ S_1^* & S_2^* & S_3^* & S_4^* \\ -S_2^* & S_1^* & -S_4^* & S_3^* \\ -S_3^* & S_4^* & S_1^* & -S_2^* \\ -S_4^* & -S_3^* & S_2^* & S_1^* \end{pmatrix}^T \quad (7)$$

Formula (8) shows the matrix of 3-antenna transmitting based on orthogonal spatial-frequency encoding at a rate of ¾:

$$G_{3,2} = \begin{pmatrix} S_1 & -S_2 & -S_3 \\ S_2^* & S_1^* & 0 \\ S_3^* & 0 & S_1^* \\ 0 & -S_3^* & S_2^* \end{pmatrix}^T \quad (8)$$

Formula (9) shows the matrix of 4-antenna transmitting based on orthogonal spatial-frequency encoding at a rate of ¾:

$$G_{4,2} = \begin{pmatrix} S_1 & S_2 & S_3 & 0 \\ -S_2^* & S_1^* & 0 & -S_3 \\ -S_3^* & 0 & S_1^* & S_2 \\ 0 & S_3^* & -S_2^* & S_1 \end{pmatrix}^T \quad (9)$$

When the encoding rate of spatial multiplexing coding is higher than 1, different data is transmitted on the same sub-carrier of different antennas to improve the data transmission rate, that is, to obtain spatial multiplexing gain. Formulas (10) to (12) show the matrixes of spatial multiplexing coding when the number of transmit antennas is 2, 3, and 4.

$$G_2 = \begin{pmatrix} S_1 \\ S_2 \end{pmatrix} \text{—Sending two data streams at the same time} \quad (10)$$

$$G_3 = \begin{pmatrix} S_1 \\ S_2 \\ S_3 \end{pmatrix} \text{—Sending three data streams at the same time} \quad (11)$$

$$G_4 = \begin{pmatrix} S_1 \\ S_2 \\ S_3 \\ S_4 \end{pmatrix} \text{—Sending four data streams at the same time} \quad (12)$$

According to the definition of encoding rate, the encoding rates in formula (10), formula (11), and formula 12 are 2, 3, and 4 respectively. Compared with SFBC at a rate of 1, spatial multiplexing coding improves the data transmission rate dramatically.

Therefore, when only SFBC of the prior art is used, spatial multiplexing gain cannot be obtained, and the transmission rate of the system is decreased because the encoding rate of SFBC is lower than 1 when the number of transmit antennas is greater than 2. Alternatively, when only spatial multiplexing coding of the prior art is used, though spatial multiplexing gain can be obtained by concurrent transmission of multiple data streams, each data stream cannot obtain diversity gain, and the transmission reliability of each data stream is decreased.

Figure 2:
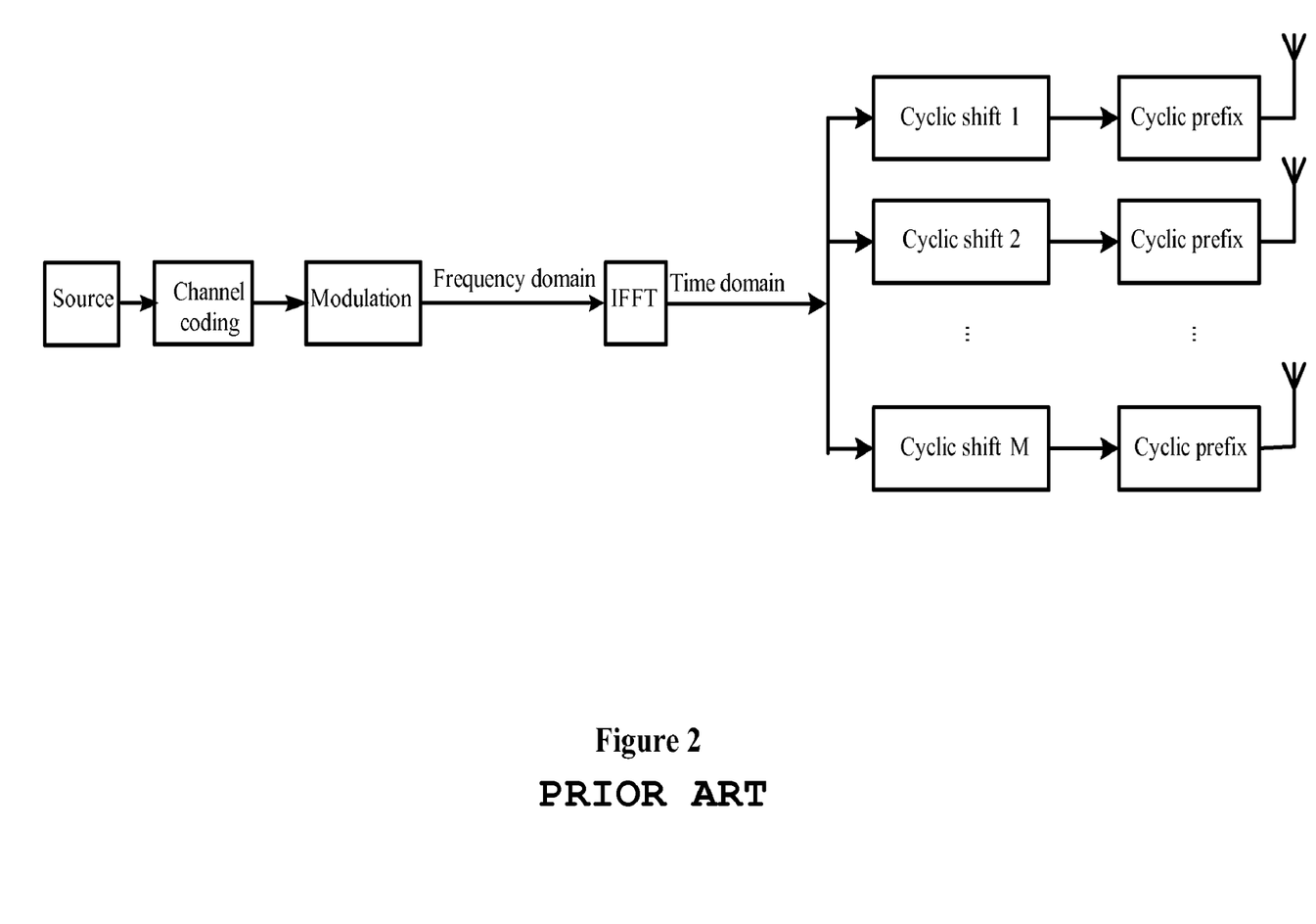
FIG. 2 shows the composition of a transmitter system that uses CSD to implement transmit diversity in the prior art.

Cyclic shift diversity (CSD) of the prior art is also a transmit diversity technology applied in OFDM systems. In this solution, frequency diversity gain is obtained in a way that the same OFDM symbols are cyclically shifted in different modes in the time domain and then transmitted by different antennas. FIG. 2 shows the structure of the transmitter.

If a system has M transmit antennas, the OFDM symbols after IFFT processing are respectively input to M transmit antennas. The OFDM symbols on the first antenna are not shifted cyclically (cyclic shift=0), and those on the other antennas are shifted cyclically with different shift bits ($\delta_m$, m=1, 2, ... M, where $\delta_1$=0). Supposing that the length of IFFT is N, the number of cyclic shift bits must meet the following condition: $0 \leq \delta_m \leq N-1$. After cyclic shift, a cyclic prefix must be added to the OFDM symbols on each antenna before the symbols are transmitted by different antennas at the same time.

In fact, the OFDM symbols transmitted on different antennas are only different cyclic shifts of the same OFDM symbol in the time domain. It is supposed that the signal of the OFDM symbol in the time domain is x(n), ($0 \leq n \leq N-1$), and that the signal corresponding to each sub-carrier in the frequency domain is X(k), k=0, ... N-1. Because the CP lengths are the same, the orthogonality of sub-carriers does not change. As seen from FFT, cyclic shifts in the time domain are equivalent to the symbols in the frequency domain plus a phase rotation. Then, the signal obtained after the rotation is as follows:

$$Z(k) = X(k)e^{-j2\pi k\delta/N}, k=0, \ldots N-1 \quad (13)$$

In formula (13), $\delta$ indicates the number of cyclic shift bits in the time domain. According to the preceding relations of shift bits, the signal on each sub-carrier of each antenna in the frequency domain can be obtained:

$$Z_m(k) = X(k)e^{-j2\pi k\delta_m/N}, k=0, \ldots N-1; m=1, \ldots M \quad (14)$$

Supposing that the number of the receive antennas on the receiver is 1, the signal received by the receiver in the frequency domain is as follows:

$$Y(k) = \sum_{m=1}^{M} H_m(k)Z_m(k) + N(k) \quad (15)$$
$$= X(k)\sum_{m=1}^{M} H_m(k)e^{-j2\pi k\delta_m/N} + N(k),$$
$$k = 0, \ldots N-1$$

Y(k) indicates the signal received on sub-carrier k. $H_m(k)$ indicates the response from the frequency domain channel between transmit antenna m and the receive antenna on sub-carrier k. N(k) indicates additive white Gaussian noise (AWGN).

According to the result of formula (15), the multi-antenna system can be equivalent to a single-antenna system:

$$Y(k) = H_e(k)X(k) + N(k), k=0, \ldots N-1 \quad (16)$$

The equivalent channel is as follows:

$$H_e(k) = \sum_{m=1}^{M} H_m(k)e^{-j2\pi k \delta_m/N} \quad (17)$$

According to the final equivalent results, cyclic shift of different antennas in the time domain is equivalent to introduction of multipath in the time domain, which enhances frequency selection in the frequency domain. In this way, frequency diversity gain can be obtained through channel coding before OFDM modulation. In comparison with a single-antenna system, this cyclic shift method helps to obtain greater frequency diversity gain under the same channel coding and interleaving.

For details about CSD, refer to the *Multicarrier Delay Diversity Modulation for MIMO Systems*.

When used alone to implement diversity, however, OFDM-based CSD has some inevitable defects: (i) the frequency diversity gain can be obtained only through channel coding; (ii) though CSD ensures that the encoding rate is 1, full-diversity gain is unavailable, and the diversity performance is inferior to orthogonal SFBC; (iii) improper delay values may lead to no frequency response on some sub-carriers, cause a puncturing effect, and affect the performance of decoders; and (iv) using CSD and SFBC together changes the responses of channels in the frequency domain, thus affecting the orthogonality of SFBC and decreasing the performance of SFBC.

SUMMARY

This section provides a general summary of the disclosure, and is not a comprehensive disclosure of its full scope or all of its features.

An embodiment provides a method and apparatus for multi-antenna transmitting based on spatial-frequency encoding to address considerations introduced by the prior art such as the inability of ensuring the encoding rate of 1 when the number of transmit antennas is greater than 2, the generation of a puncturing effect when improper delay values are used for CSD, and the inability of obtaining the transmit diversity gain when spatial multiplexing coding is used.

To address the above technical issues, an embodiment provides a method for multi-antenna transmitting based on spatial-frequency encoding. The method includes:

performing spatial-frequency encoding on input data and outputting multiple ways of encoded data;

mapping the encoded data to the same sub-carrier of each antenna in an antenna group;

adding a phase shift respectively to the encoded data on different sub-carriers of each antenna;

performing OFDM modulation on the phase-shifted encoded data on each antenna; and transmitting the OFDM-modulated data through transmit antennas.

Further, an embodiment provides an apparatus for multi-antenna transmitting based on spatial-frequency encoding. The apparatus includes:

at least one spatial-frequency encoding unit, adapted to perform spatial-frequency encoding on input data and output at least two ways of encoded data;

at least two data mapping units, connected to the spatial-frequency encoding unit and adapted to map the encoded data to the same sub-carrier of each antenna in an antenna group;

at least two phase shifting units, connected to the two data mapping units respectively and adapted to add a phase shift to the encoded data on the sub-carriers of each antenna;

at least two OFDM modulating units, connected to phase shifting units and adapted to OFDM-modulate the encoded data after phase shifting and overlapping on antennas; and at least two transmitting units, connected to two OFDM modulating units and adapted to transmit the OFDM-modulated data.

Therefore, an embodiment uses phase shifting in the frequency domain to replace cyclic shifting of CSD in the time domain, effectively avoiding the puncturing effect and preventing the combination of orthogonal SFBC and CSD from destroying the orthogonality of orthogonal SFBC.

An embodiment combines the spatial-frequency encoding and the phase shift transmit diversity to obtain the transmit diversity gain, spatial multiplexing gain, and frequency diversity gain; combines SFBC and phase shifting to solve the issue that the encoding rate is lower than 1 when the number of transmit antennas is greater than 2 in the case of using SFBC only; and combines spatial multiplexing coding and phase shifting to solve the inability of obtaining the diversity gain of each data stream if spatial multiplexing coding is used only.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

An embodiment combines SFBC and CSD to ensure the encoding rate of 1 when the number of transmit antennas is greater than 2. In this case, antennas are categorized into two groups, each containing at least one antenna. After SFBC is performed on input data according to the encoding matrix in formula (1), two ways of concurrent encoded data are output. Each way of data is mapped to a transmit antenna group. The data is OFDM modulated, cyclically shifted, and then transmitted on different antennas in the same antenna group. However, certain considerations arise when SFBC and CSD are directly used together. The reason is that the signals received on sub-carriers k and k+1 in the frequency domain can be expressed by formulas (18) and (19) (supposing that the receiver has only one antenna).

$$Y(k) = \left(H_1(k) + H_2(k)e^{-j\frac{2\pi k\tau_1}{N}}\right)S_1 + \quad (18)$$
$$\left(H_3(k) + H_4(k)e^{-j\frac{2\pi k\tau_2}{N}}\right)S_2 + N_1(k)$$
$$= H_{1e}(k)S_1 + H_{2e}(k)S_2 + N_1(k)$$

$$Y(k+1) = \left(H_1(k+1) + H_2(k+1)e^{-j\frac{2\pi(k+1)\tau_1}{N}}\right)(-S_2^*) + \quad (19)$$
$$\left(H_3(k+1) + H_4(k+1)e^{-j\frac{2\pi(k+1)\tau_2}{N}}\right)S_1^* + N_2(k)$$
$$= H'_{1e}(k)(-S_2^*) + H'_{2e}(k)S_1^* + N_2(k)$$

Formula (20) must be met if data is encoded and second-order diversity gain is obtained according to formulas (4) and (5):

$$H_{1e}(k)=H_{1e}'(k), H_{2e}(k)=H_{2e}'(k) \quad (20)$$

Because the spacing between sub-carriers k and k+1 is often smaller than the channel bandwidth, the following conditions are met: $H_1(k)=H_1(k+1)$, $H_2(k)=H_2(k+1)$, $H_3(k)=H_3(k+1)$, $H_4(k)=H_4(k+1)$. The following conditions must be met to make formula (20) valid:

$$e^{-j\frac{2\pi k\tau_1}{N}} = e^{-j\frac{2\pi(k+1)\tau_1}{N}}$$

and $$e^{-j\frac{2\pi k\tau_2}{N}} = e^{-j\frac{2\pi(k+1)\tau_2}{N}}.$$

At this time, the condition of $\tau_1=\tau_2=0$ must be met. That means no CSD is performed. Therefore, CSD cannot be used to obtain the frequency diversity gain. To make formula 20 valid, that is, $H_{1e}(k)=H_{1e}'(k)$, $H_{2e}(k)=H_{2e}'(k)$, the frequency domain data transmitted on adjacent n sub-carriers of the same antenna based on SFBC must have the same phase shift, but this cannot be achieved if CSD is used alone. Further, the essence of obtaining diversity gain based on CSD is that the same frequency domain data transmitted on different antennas is multiplied by different phase shifts. Therefore, the present embodiment uses SFBC and CSD together and uses phase shifting in the frequency domain to replace cyclic shifting of CSD in the time domain. This phase shift meets the following conditions: the phase shift on the same transmit antenna changes every n sub-carrier sets, and the phase shifts on the same sub-carrier of different transmit antennas in the same antenna group are different. Those skilled in the art may understand that an embodiment may meet formula (20) and may also obtain frequency diversity gain similar to CSD.

The present disclosure is hereinafter described in detail with reference to embodiments and accompanying drawings. In an embodiment, multi-antenna transmitting is based on, but is not limited to, SFBC and phase shifting, as well as spatial multiplexing coding and phase shifting.

Figure 3:
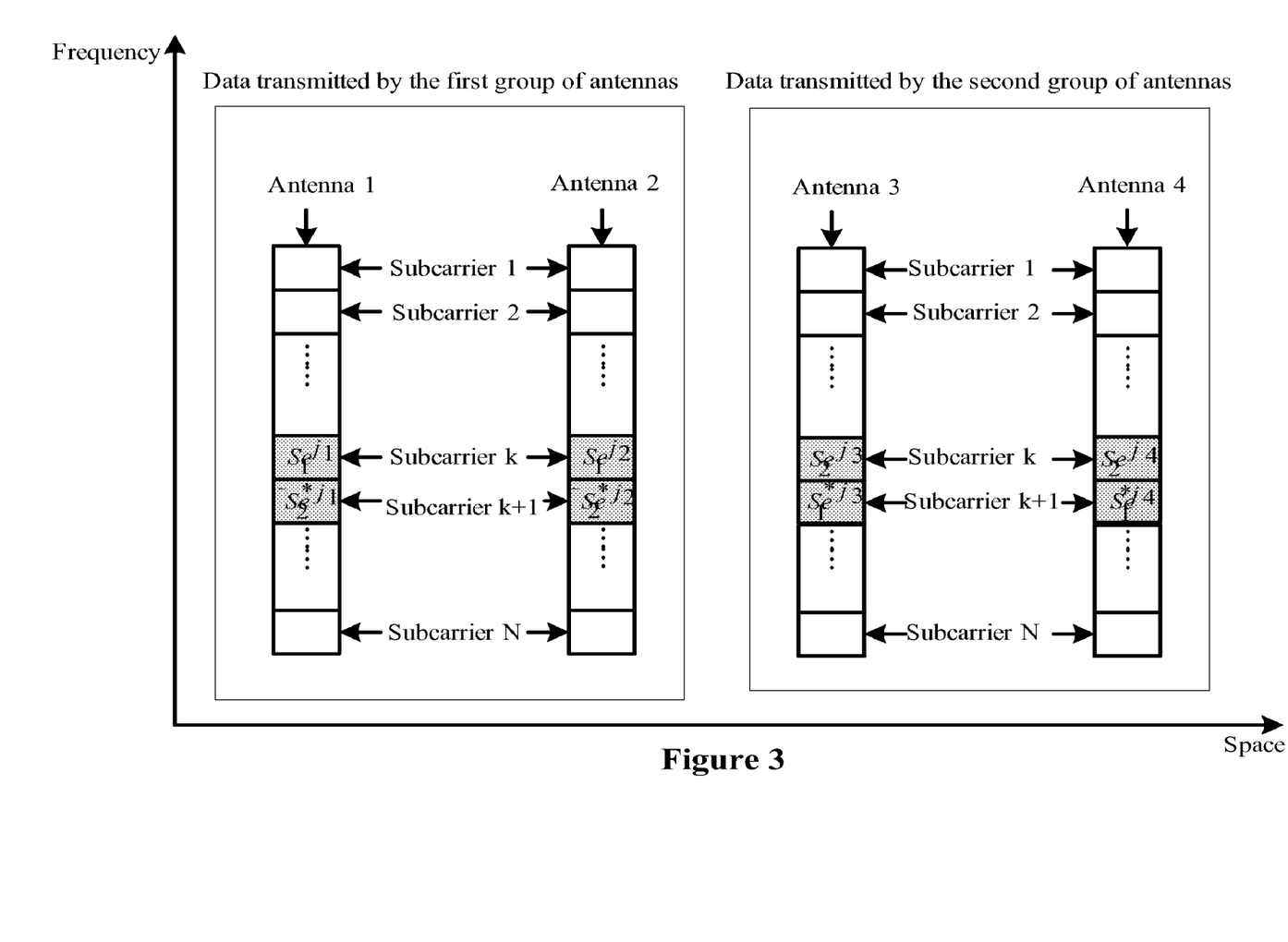
FIG. 3 is a schematic diagram showing the mapping of data for multi-antenna transmitting based on SFBC and phase shifting in space and frequency dimensions according to an embodiment.

As shown in FIG. 3, the data for multi-antenna transmitting based on SFBC and phase shifting is mapped respectively in time and frequency dimensions, where, sub-carriers k and k+1 are sub-carriers for one SFBC, antennas 1 and 2 are in antenna group 1, the phase shift of sub-carriers k and k+1 on antenna 1 is $\theta_1$, and that on antenna 2 is $\theta_2$; antennas 3 and 4 are in antenna group 2, the phase shift of sub-carriers k and k+1 on antenna 3 is $\theta_3$, and that on antenna 4 is $\theta_4$. In addition, $\theta_1 \neq \theta_2$ and $\theta_3 \neq \theta_4$.

When there is one receive antenna, the signals received by the receiver on sub-carriers k and k+1 in the frequency domain can be expressed by formulas (22) and (23).

$$Y(k) = (H_1(k)e^{j\theta_1} + H_2(k)e^{-j\theta_2})S_1 + \quad (22)$$
$$(H_3(k)e^{j\theta_3} + H_4(k)e^{j\theta_4})S_2 + N_1(k)$$
$$= H_{1e}(k)S_1 + H_{2e}(k)S_2 + N_1(k)$$

$$Y(k+1) = (H_1(k+1)e^{j\theta_1} + H_2(k+1)e^{-j\theta_2})(-S_2^*) + \quad (23)$$
$$(H_3(k+1)e^{j\theta_3} + H_4(k+1)e^{j\theta_4})S_1^* + N_2(k)$$
$$= H'_{1e}(k)(-S_2^*) + H'_{2e}(k)S_1^* + N_2(k)$$

As can be known by those skilled in the art that, if decoding is performed according to formulas (4) and (5), formula (20) can be met and thus second-order diversity gain can be obtained. Moreover, because $\theta_1 \neq \theta_2$ and $\theta_3 \neq \theta_4$, the diversity gain similar to CSD can be obtained.

The present disclosure is described below with reference to some exemplary embodiments.

Figure 4:
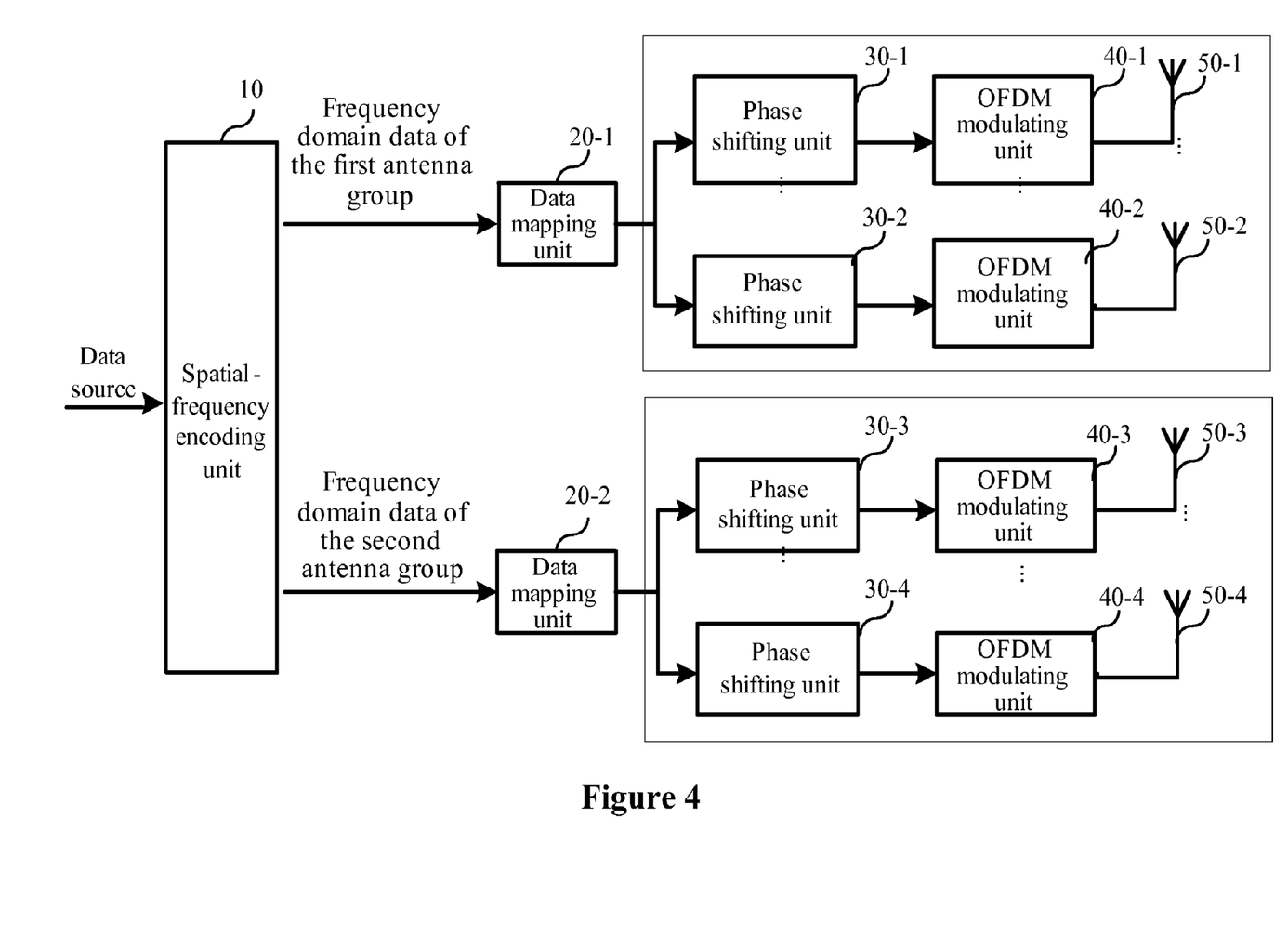
FIG. 4 is a schematic diagram showing the structure of an apparatus for multi-antenna transmitting based on SFBC and phase shifting according to an embodiment.

FIG. 4 shows the structure of an apparatus for multi-antenna transmitting based on SFBC and phase shifting according to an embodiment.

The apparatus includes at least one spatial-frequency encoding unit, two data mapping units, two phase shifting units, two OFDM modulating units, and two transmit antennas. The spatial-frequency encoding unit is adapted to perform spatial-frequency encoding on the input data and output at least 2 ways of encoded data. The data mapping units are connected to the spatial-frequency encoding unit and adapted to map each way of the encoded data to the same sub-carrier of each antenna in an antenna group. The phase shifting units are adapted to add a phase shift respectively to the encoded data on each sub-carrier of an antenna. The OFDM modulating units are connected to the phase shifting units and adapted to OFDM-modulate the encoded data on each sub-carrier of an antenna. The transmit antennas are connected to the OFDM modulating units and adapted to transmit the OFDM-modulated data. For descriptive purposes, the embodiment provides an apparatus for 4-antenna transmitting. The apparatus includes, but is not limited to, one spatial-frequency encoding unit 10, two data mapping units 20-1 and 20-2, four phase shifting units 30-1, 30-2, 30-3, and 30-4, four OFDM modulating units 40-1, 40-2, 40-3, and 40-4, and four transmit antennas 50-1, 50-2, 50-3, and 50-4. The spatial-frequency encoding unit 10 outputs the frequency domain data of the first antenna group to the data mapping unit 20-1 and the frequency domain data of the second antenna group to the data mapping unit 20-2. The data mapping unit 20-1 is connected to the phase shifting units 30-1 and 30-2. The data mapping unit 20-2 is connected to the phase shifting units 30-3 and 30-4. The four phase shifting units 30-1, 30-2, 30-3, and 30-4, four OFDM modulating units 40-1, 40-2, 40-3, and 40-4, and four transmit antennas 50-1, 50-2, 50-3, and 50-4 correspond to each other and are connected in sequence.

At least four transmit antennas are typically employed in this embodiment because each antenna group has at least one transmit antenna and at least one antenna group has two transmit antennas. The number of transmit antennas typically ensures the implementation of antenna groups, but does not affect the essence of the disclosure. For ease of description, it is assumed that each antenna group contains two transmit antennas in a first embodiment. FIG. 4 shows the groups of antennas in the first embodiment, where the transmit antennas marked in the same broken line frame belong to the same group.

The spatial-frequency encoding unit 10 is adapted to perform spatial-frequency encoding on input data. The spatial-frequency encoding unit 10 uses the following formula to ensure that the spatial-frequency encoding is completed within an OFDM symbol period.

$$G = \begin{pmatrix} S_1 & -S_2^* \\ S_2 & S_1^* \end{pmatrix} \quad (1)$$

Formula (1) is a second-order orthogonal encoding matrix. It may be understood that encoding in only space and frequency dimensions can be completed within one OFDM symbol period. The second-order orthogonal encoding is to ensure that the encoding rate is 1 and that the decoding method is simple. Theoretically, higher order or non-orthogonal encoding may be also used.

It is supposed that the input data is $S_1$ and $S_2$. After the data is transmitted through the spatial-frequency encoding unit 10, two ways of encoded data are output, namely, $S_1$ and $-S_2^*$, and $S_2$ and $S_1^*$.

The data mapping units 20-1 and 20-2 each copy one way of encoded data for the respective connected phase shifting units according to the input encoded data received and map the encoded data to each sub-carrier in turn.

The phase shifting unit is adapted to add the phase shifts of the other phase shifting units in the same antenna group to the input frequency domain data. The phase shifts are different. It may be understood that: the phase shifting unit adds the same phase shift to the encoded frequency domain data transmitted by the same transmit antenna on n adjacent sub-carrier pairs based on SFBC; the phase shifts of every n sub-carrier sets are different; and the phase shifts of the sub-carriers with the same frequency on different antennas in the same antenna group are different. For example, in the first embodiment, sub-carriers k and k+1 are sub-carriers for one SFBC, transmit antennas 50-1 and 50-2 are in antenna group 1, the phase shift of sub-carriers k and k+1 on transmit antenna 50-1 is $\theta_1$, and that on antenna 50-2 is $\theta_2$; transmit antennas 50-3 and 50-4 are in antenna group 2, the phase shift of sub-carriers k and k+1 on antenna 50-3 is $\theta_3$, and that on antenna 50-4 is $\theta_4$, where, $\theta_1 \neq \theta_2$ and $\theta_3 \neq \theta_4$.

The OFDM modulating unit modulates the phase-shifted encoded data that is output by the phase shifting units to the sub-carriers of OFDM. This unit may be implemented by IFFT. Those of ordinary skills in the art may already know the specific implementation process, so details are omitted.

The transmit antenna is adapted to transmit the output data of the OFDM modulating unit.

For ease of implementation, in a second embodiment, the phase shift of the encoded data on one antenna 50 of the same group may be set to 0, that is, $\theta_1 = 0$ and $\theta_3 = 0$ in the first embodiment. In addition, the phase shift sequences of different antenna groups may be set to the same for multiplexing of phase shifting units 30, that is, $\theta_2 = \theta_4$ in the first embodiment.

In the third embodiment, time-varying phase sequences may be used to speed up channel changes, that is, enabling $\theta_1$, $\theta_2$, $\theta_3$, and $\theta_4$ in the first embodiment to change in real time and differ between each or multiple OFDM symbols.

Figure 5:
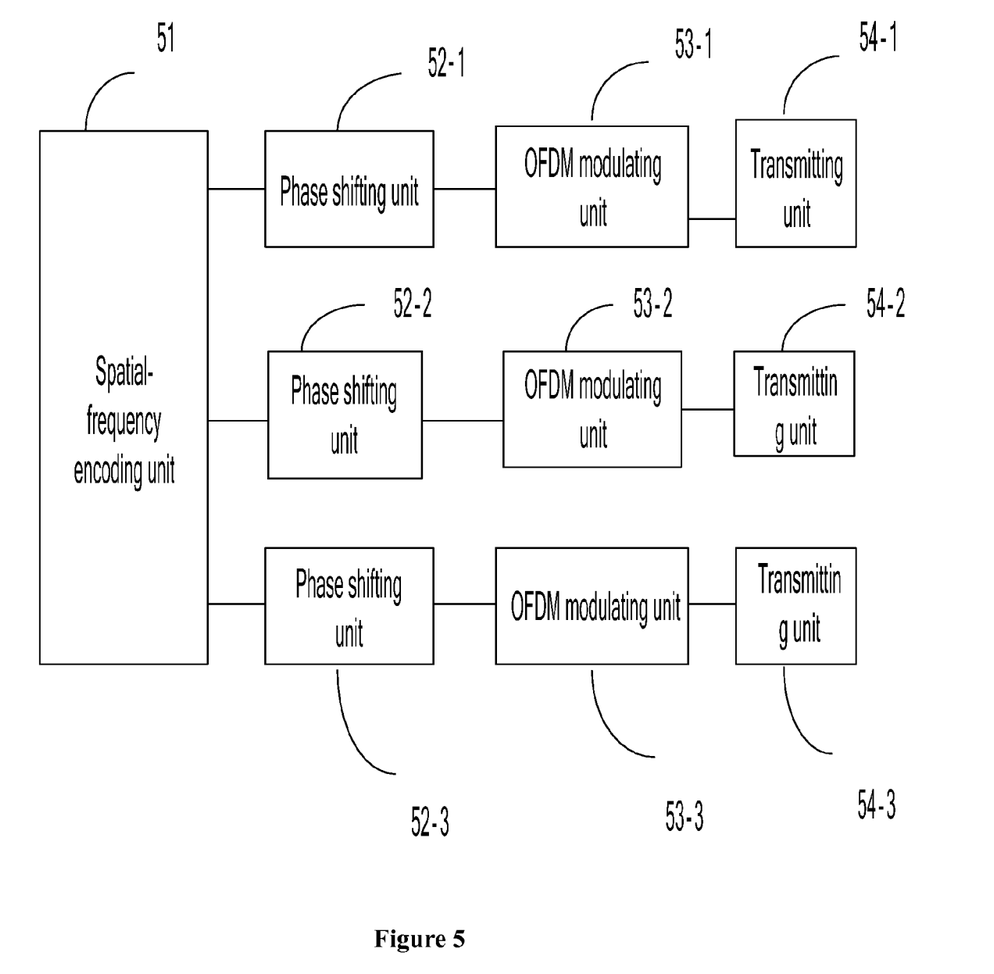
FIG. 5 is another schematic diagram showing the structure of the apparatus for multi-antenna transmitting based on SFBC and phase shifting according to an embodiment.

FIG. 5 shows another structure of the apparatus for multi-antenna transmitting, taking 3-antenna transmitting as an example, based on spatial-frequency encoding in an embodiment. The apparatus includes at least one spatial-frequency encoding unit 51, three phase shifting units 52-1, 52-2, and 52-3, three OFDM modulating units 53-1, 53-2, and 53-3, and three transmitting units 54-1, 54-2, and 54-3. The spatial-frequency encoding unit 51 is adapted to perform spatial frequency encoding on input data and output two ways of encoded data through two antenna groups. The three phase shifting units are adapted to add a phase shift to the encoded data received from the spatial-frequency encoding unit. The three OFDM modulating units are connected to the three phase shifting units and adapted to OFDM-modulate the phase-shifted encoded data to corresponding sub-carriers. The three transmitting units are connected to the three OFDM modulating units and adapted to transmit the modulated data.

For functions of each unit of this apparatus, refer to related descriptions above.

Further, when spatial multiplexing coding is used, each data stream cannot obtain frequency diversity gain, which decreases the transmission quality. Therefore, in the fourth embodiment, spatial multiplexing coding and phase shifting are used together to obtain not only spatial multiplexing gain but also frequency diversity gain.

Figure 6:
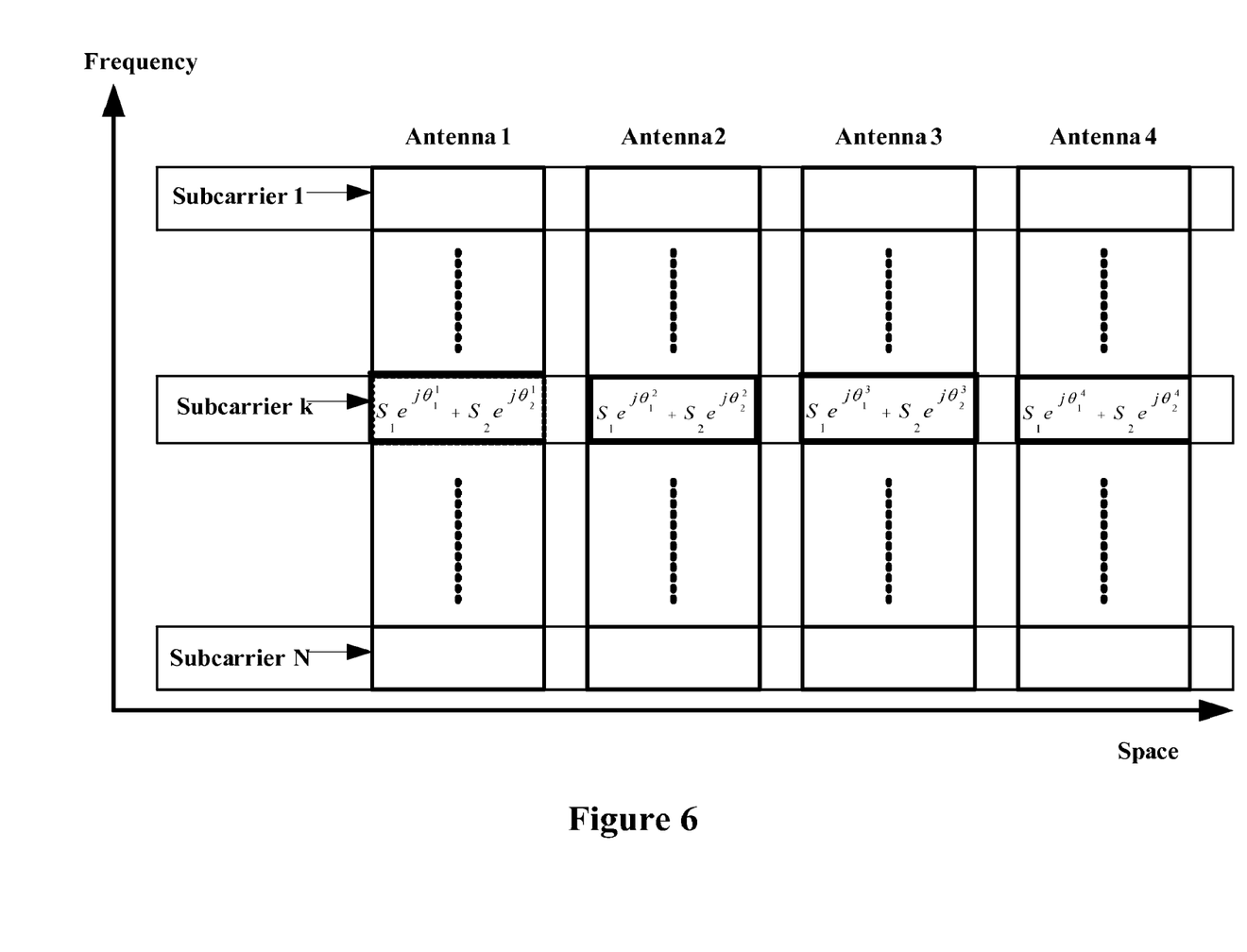
FIG. 6 is a schematic diagram showing the mapping of data for multi-antenna transmitting based on spatial multiplexing coding and phase shifting in time and frequency dimensions according to an embodiment.

FIG. 6 shows the mapping of data for multi-antenna transmitting based on spatial multiplexing coding and phase shifting in time and frequency dimensions. It is supposed that the number of transmit antennas is 4. Formula (10) shows the spatial multiplexing coding at a rate of 2. As seen from formula (10), only one sub-carrier is needed for one spatial multiplexing coding operation. FIG. 6 takes sub-carrier k as an example. Operations on other sub-carriers are similar. At this time, all transmit antennas belong to the same group, the input data is directly converted into two ways of concurrent data, and each way of data is mapped to all antennas for transmitting. On sub-carrier k, the phase shift of the encoded data $S_1$ is $\theta_1^1$ on antenna 1, $\theta_1^2$ on antenna 2, $\theta_1^3$ on antenna 3, and $\theta_1^4$ on antenna 4. The phase shift of the encoded data $S_2$ is $\theta_2^1$ on antenna 1, $\theta_2^2$ on antenna 2, $\theta_2^3$ on antenna 3, and $\theta_2^4$ on antenna 4. Then all the phase-shifted data is added up on each antenna. Data $$S_1 e^{j\theta_1^1} + S_2 e^{j\theta_2^1}$$

is transmitted by antenna 1 on sub-carrier k, $$S_1 e^{j\theta_1^2} + S_2 e^{j\theta_2^2}$$

is transmitted by antenna 2, $$S_1 e^{j\theta_1^3} + S_2 e^{j\theta_2^3}$$

is transmitted by antenna 3, and $$S_1 e^{j\theta_1^4} + S_2 e^{j\theta_2^4}$$

is transmitted by antenna 4.

For ease of implementation, in the fifth embodiment, the phase shift of the encoded data transmitted by one antenna in the same antenna group in the fourth embodiment may be set to 0, corresponding to $\theta_1^1=0$ and $\theta_2^1=0$ in the first embodiment.

In the sixth embodiment, time-varying phase sequences may be used in the fourth embodiment to speed up channel changes, that is, enabling $\theta_1^1, \theta_1^2, \theta_1^3, \theta_1^4, \theta_2^1, \theta_2^2, \theta_2^3$, and $\theta_2^4$ to change in real time and differ between each or multiple OFDM symbols in the first embodiment.

Figure 7:
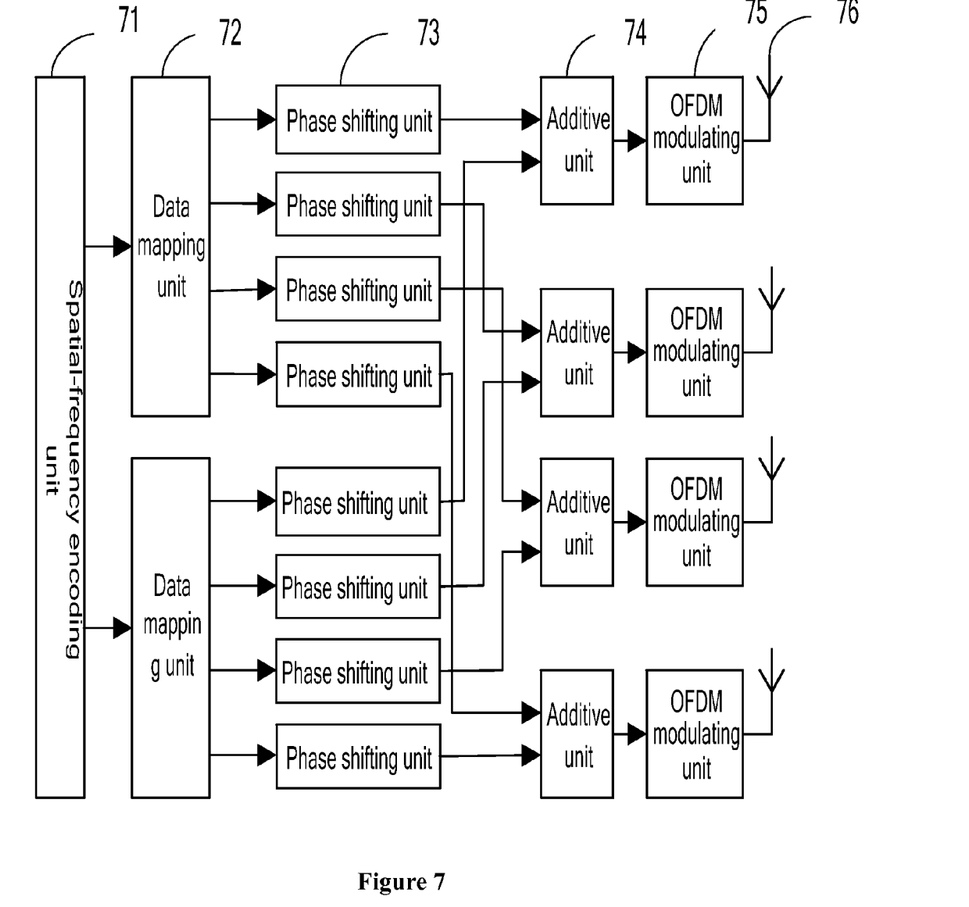
FIG. 7 is a schematic diagram showing the structure of an apparatus for multi-antenna transmitting based on spatial multiplexing coding and phase shifting according to an embodiment.

FIG. 7 shows an apparatus for multi-antenna transmitting based on spatial multiplexing coding and phase shifting in an embodiment. Taking 4-antenna transmitting as an example, the apparatus includes at least one spatial-frequency encoding unit 71, two data mapping units 72-1 and 72-2, two phase shifting units, one additive unit, one OFDM modulating unit, and one transmit antenna. For descriptive purposes, this embodiment uses eight phase shifting units (expressed by 73), four additive units (expressed by 74), four OFDM modulating units (expressed by 75), and four transmit antennas (expressed by 76). The spatial-frequency encoding unit 71 is adapted to perform spatial-frequency encoding on the input data and output at least two ways of encoded data. The data mapping unit 72 is connected to the spatial-frequency encoding unit 71 and adapted to map the multiple ways of encoded data to the same sub-carrier of each antenna in an antenna group. The phase shifting unit 73 is adapted to add a phase shift respectively to the encoded data on each sub-carrier of an antenna. The additive unit 74 is connected to the phase shifting unit 73 and adapted to add up the phase-shifted encoded data. The OFDM modulating unit 75 is connected to the additive unit 74 and adapted to OFDM-modulate the encoded data added up on each sub-carrier of an antenna. The transmit antenna 76 is connected to the OFDM modulating unit 75 and adapted to transmit the OFDM-modulated data.

One difference between this embodiment and the preceding embodiments is as follows: When spatial multiplexing coding is used, after the phase shifting unit 73 adds a phase shift to the encoded data on the sub-carriers of each antenna, the additive unit 74 adds up the encoded data, and then transmits the encoded data to the OFDM modulating unit 75. The subsequent processing is the same as that of the preceding embodiments.

For functions of each unit of this apparatus, refer to related descriptions above.

Figure 8:
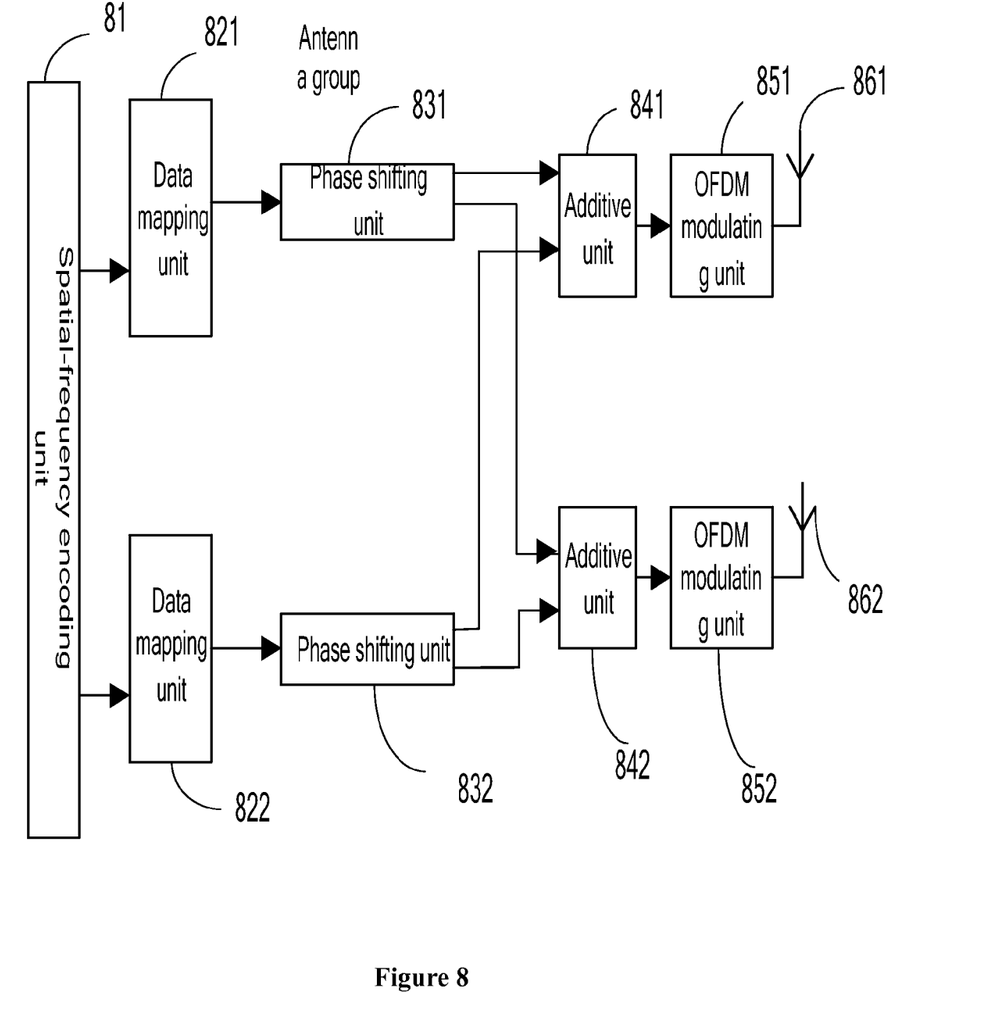
FIG. 8 is another schematic diagram showing the structure of the apparatus for multi-antenna transmitting based on spatial multiplexing coding and phase shifting according to an embodiment.

FIG. 8 shows another structure of the apparatus for multi-antenna transmitting based on spatial multiplexing coding and phase shifting in an embodiment. The apparatus includes at least one spatial-frequency encoding unit 81, two data mapping units 821 and 822, two phase shifting units 831 and 832, two additive units 841 and 842, two OFDM modulating units 851 and 852, and two transmitting units 861 and 862. The spatial-frequency encoding unit 81 is adapted to perform spatial-frequency encoding on the input data and output at least two ways of encoded data. The data mapping units 821 and 822 are connected to the spatial-frequency encoding unit 81 and adapted to map one way of the encoded data to the same sub-carrier of each antenna in an antenna group. The phase shifting units 831 and 832 are connected to the phase mapping units 821 and 822 and adapted to add a phase shift respectively to the encoded data on sub-carriers of each antenna. The additive units 841 and 842 are connected to the phase shifting units 831 and 832 and adapted to add up the phase-shifted encoded data on each sub-carrier of an antenna. The OFDM modulating units 851 and 852 are connected to the additive units 841 and 842 and adapted to OFDM-modulate the phase-shifted encoded data added up on antennas. The transmitting units 861 and 862 are connected to the OFDM modulating units 851 and 852 and adapted to transmit the modulated data.

One specific implementation process may be similar to that of preceding embodiments.

Figure 9:
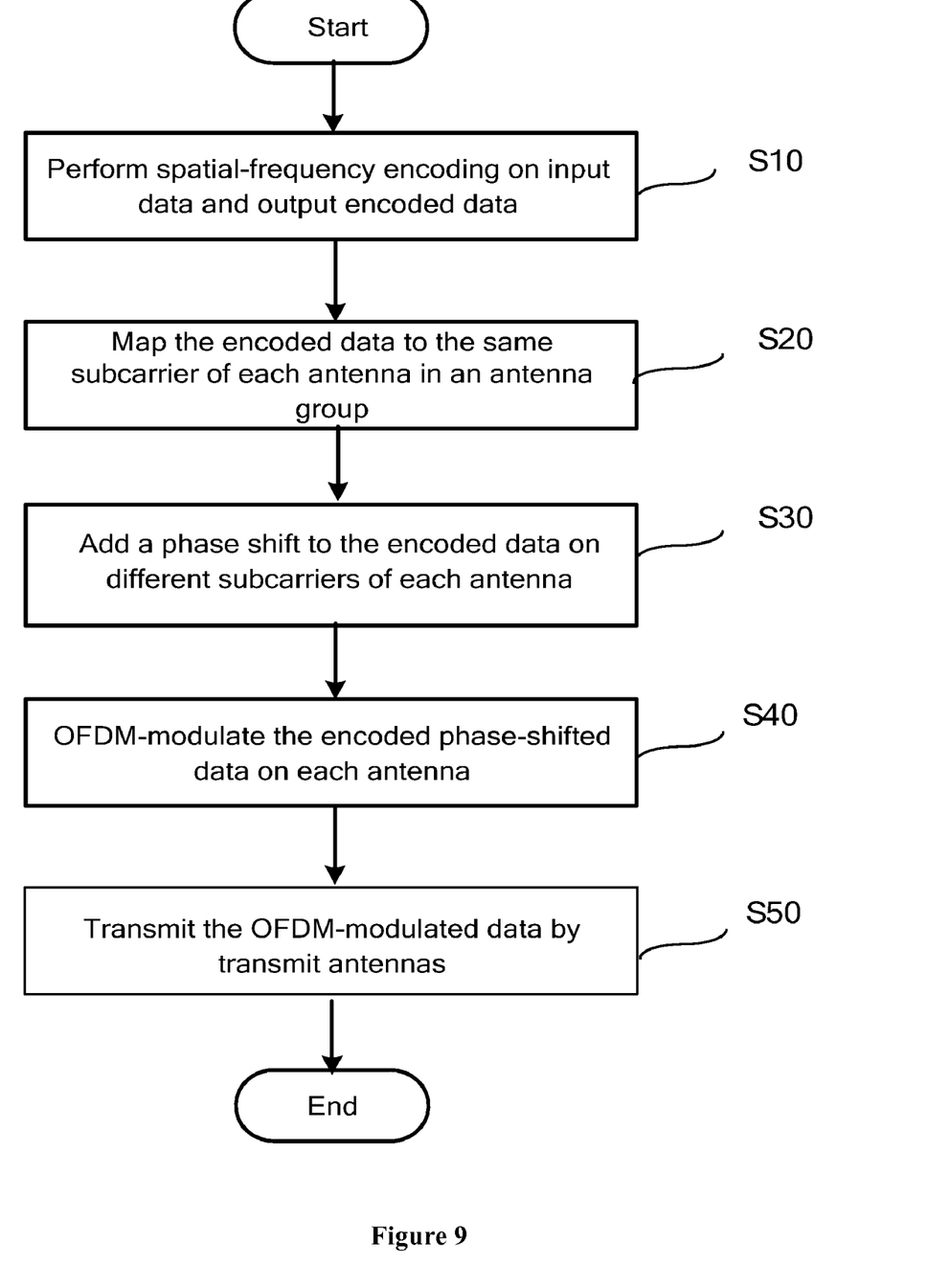
FIG. 9 is a flowchart of the method for multi-antenna transmitting based on SFBC and phase shifting according to an embodiment.

Further, an embodiment provides a method for multi-antenna transmitting based on spatial multiplexing coding and phase shifting. FIG. 9 shows the specific process. The method includes:

S10: performing spatial-frequency encoding on input data and outputting multiple ways of encoded data;

S20: mapping the encoded data to the same sub-carrier of each antenna in an antenna group;

S30: adding a phase shift to the encoded data on different sub-carriers of each antenna;

S40: OFDM-modulating the phase-shifted encoded data on each antenna; and

S50: transmitting the OFDM-modulated data through transmit antennas.

When spatial-frequency multiplexing coding is used, this method also includes adding up the phase-shifted encoded data on each antenna before OFDM modulation.

In S10, spatial-frequency encoding is performed on the input data. The spatial-frequency encoding unit 10 uses the second-order orthogonal encoding matrix shown in formula 1 to ensure that spatial-frequency encoding is completed within an OFDM symbol period. It is supposed that the input data is $S_1$ and $S_2$. After the data is transmitted to the spatial-frequency encoding unit 10, two ways of encoded data are output, namely, $S_1$ and $-S_2^*$, and $S_2$ and $S_1^*$.

Then the process proceeds to S20. Multiple transmit antennas are grouped and the encoded data is mapped to the same sub-carrier of each antenna in the antenna group.

When SFBC is used, the number of antenna groups is equal to the number of ways of space frequency encoded data. When spatial multiplexing coding is used, the number of antenna groups is 1.

Then the process proceeds to S30. A phase shift is added respectively to the encoded data on different sub-carriers of each antenna. The phase shift meets the following conditions: the phase shifts of the encoded frequency domain data transmitted by the same transmit antenna on n adjacent sub-carrier pairs based on SFBC are the same; the phase shifts are different every n sub-carrier sets, and the phase shifts of the sub-carriers with the same frequency on different antennas in the same antenna group are different.

When SFBC is used, each way of data is mapped to different antenna groups. When spatial multiplexing coding is used, all data is mapped to the same antenna group.

Then the process proceeds to S40, where the phase-shifted encoded data on each antenna is OFDM-modulated, or the phase-shifted encoded data is added up and then OFDM-modulated. In this embodiment, OFDM may be implemented by IFFT.

Then the process proceeds to S50, where the OFDM-modulated data is transmitted by transmit antennas. In other words, the encoded data after mapping (namely, OFDM modulation) on sub-carriers is transmitted by antennas.

For the implementation of each process in this method, refer to descriptions of the functions of related units above.

In this embodiment, for ease of implementation, the phase shift of the encoded data on one of the transmit antennas in the same group may be set to 0, and the phase shifts of different antenna groups may be set to the same. Moreover, time-varying phase shifts may be used to adapt to channel changes better.

An embodiment not only uses spatial-frequency encoding to obtain space diversity gain and spatial multiplexing gain, but also introduces a phase shift to the frequency domain to obtain extra frequency diversity gain similar to CSD. The phase shift meets the following conditions: the phase shift of the encoded data on the same transmit antenna changes every n sub-carrier sets; the phase shifts of different ways of data on the same sub-carrier of the same transmit antenna are different; and the phase shifts on the same sub-carrier of different transmit antennas in the same antenna group are different.

Therefore, the present disclosure uses phase shifting in the frequency domain to replace CSD in the time domain, which effectively avoids the puncturing effect of CSD and prevents direct use of orthogonal SFBC and CSD from destroying the orthogonality of orthogonal SFBC.

Further, an embodiment combines spatial-frequency encoding and phase shift transmit diversity to obtain transmit diversity gain, spatial multiplexing gain, and frequency diversity gain. The combined use of SFBC and phase shifting can solve the issue that the encoding rate is lower than 1 when the number of transmit antennas is greater than 2 when SFBC is used. The combined use of spatial multiplexing coding and phase shifting solves the inability of obtaining the diversity gain of each data stream if only spatial multiplexing coding is used.

In addition, the phase shift is set to change every n sub-carrier sets, effectively ensuring that the channel change speed in n sub-carrier sets is not changed, and thus the interference estimation accuracy is not affected by the phase shift when a receiver capable of interference elimination is used.

The present disclosure has been described through some exemplary embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for multi-antenna transmitting based on spatial-frequency encoding, comprising:

performing a spatial-frequency encoding on input data and outputting multiple ways of encoded data;

mapping the multiple ways of encoded data to the same sub-carrier of each antenna in an antenna group;

adding a phase shift to each way of encoded data on different sub-carriers of each antenna;

performing orthogonal frequency division multiplexing (OFDM) modulation on each way of phase-shifted encoded data on each antenna; and transmitting the OFDM-modulated data through transmit antennas;

grouping multiple transmit antennas, wherein the number of antenna groups is equal to the number of ways of space frequency encoded data when space frequency block code (SFBC) is used; and the number of antenna groups is 1 when spatial multiplexing coding is used;

wherein the phase-shifted encoded data on each antenna is added up and then OFDM-modulated when the spatial-frequency encoding is spatial multiplexing coding;

wherein the phase shift meets the following conditions:

the phase shift of the encoded data on the same transmit antenna changes every n sub-carrier sets; the phase shifts of different ways of data on the same sub-carrier of the same transmit antenna are different; and the phase shifts on the same sub-carrier of different transmit antennas in the same antenna group are different, wherein n is a positive integer.

2. The method of claim 1, wherein each way of data is mapped to different antenna groups when SFBC is used; and all data is mapped to the same antenna group when spatial-frequency encoding is used.

3. The method of claim 1, wherein the process of performing spatial-frequency encoding on the input data comprises:

using N-order, orthogonal, or non-orthogonal SFBC and/or spatial multiplexing coding for spatial-frequency encoding, wherein N is a positive integer equal to or greater than 2.

4. The method of claim 1, wherein the added phase shift is time-varying or not time-varying.

5. The method of claim 1, wherein the phase shift in each antenna group is set to 0.

6. A method for multi-antenna transmitting based on spatial-frequency encoding, comprising:

performing a spatial-frequency encoding on input data and outputting multiple ways of encoded data; mapping the multiple ways of encoded data to the same sub-carrier of each antenna in an antenna group;

adding a phase shift to each way of encoded data on different sub-carriers of each antenna;

performing orthogonal frequency division multiplexing (OFDM) modulation on each way of phase-shifted encoded data on each antenna; and transmitting the OFDM-modulated data through transmit antennas;

grouping multiple transmit antennas, wherein the number of antenna groups is equal to the number of ways of space frequency encoded data when space frequency block code (SFBC) is used; and the number of antenna groups is 1 when spatial multiplexing coding is used;

wherein the phase shift meets the following conditions:

the phase shift of the encoded data on the same transmit antenna changes every n sub-carrier sets; the phase shifts of different ways of data on the same sub-carrier of the same transmit antenna are different; and the phase shifts on the same sub-carrier of different transmit antennas in the same antenna group are different, wherein n is a positive integer.

7. The method of claim 6, wherein each way of data is mapped to different antenna groups when SFBC is used; and all data is mapped to the same antenna group when spatial-frequency encoding is used.

8. The method of claim 6, wherein the process of performing spatial-frequency encoding on the input data comprises:
using N-order, orthogonal, or non-orthogonal SFBC and/or spatial multiplexing coding for spatial-frequency encoding, wherein N is a positive integer equal to or greater than 2.

9. The method of claim 6, wherein the added phase shift is time-varying or not time-varying.

10. The method of claim 6, wherein the phase shift in each antenna group is set to 0.

11. An apparatus for multi-antenna transmitting based on spatial-frequency encoding, comprising:
at least one spatial-frequency encoding unit, adapted to perform spatial-frequency encoding on input data and output at least two ways of encoded data;

at least two data mapping units, connected to the spatial-frequency encoding unit and adapted to map the encoded data to the same sub-carrier of each antenna in an antenna group;

at least two phase shifting units, connected to the data mapping units and adapted to add a phase shift to the encoded data on sub-carriers of each antenna;

at least two orthogonal frequency division multiplexing (OFDM) modulating units, connected to the phase shifting units and adapted to OFDM-modulate the phase-shifted encoded data added up on antennas; and at least two transmitting units, connected to the OFDM modulating units and adapted to transmit the modulated data;

wherein the phase shifting unit comprises:

a phase shift setting sub-unit, adapted to set a phase shift for the encoded data received on each sub-carrier of each antenna, where the phase shift meets the following conditions: the phase shift of the encoded data on the same antenna changes every n sub-carrier sets; the phase shifts of different ways of data on the same sub-carrier of the same transmit antenna are different; and the phase shifts on the same sub-carrier of different transmit antennas in the same antenna group are different, wherein n is a positive integer; and a phase shift executing sub-unit, connected to the phase shift setting sub-unit and adapted to add a phase shift according to the sub-carriers used for spatial-frequency encoding.

12. The apparatus of claim 11, further comprising: at least two additive units, connected to the phase shifting units and adapted to add up the phase-shifted encoded data received on each sub-carrier of an antenna.

13. The apparatus of claim 11, wherein the spatial-frequency encoding unit encodes data according to N-order, orthogonal, or non-orthogonal space frequency block code (SFBC) and/or spatial multiplexing coding, where N is a positive integer equal to or greater than 2.

* * * * *